United States Patent [19]
Blakey et al.

[11] Patent Number: 5,562,215
[45] Date of Patent: Oct. 8, 1996

[54] TWO WHEELED VEHICLE SUPPORT APPARATUS

[76] Inventors: Nelson E. Blakey, R.R. #2, Box 162, Moweaqua, Ill. 62550; Ronald L. Williams, P.O. Box 149, Athens, Ill. 62613

[21] Appl. No.: 341,657

[22] Filed: Nov. 17, 1994

[51] Int. Cl.$^6$ .................................................. A47F 7/00
[52] U.S. Cl. ............................ 211/17; 211/22; 280/293; 248/188.2
[58] Field of Search .................... 211/17, 22; 280/293; 248/346, 188.2

[56] References Cited

U.S. PATENT DOCUMENTS

| | | | |
|---|---|---|---|
| 2,805,860 | 9/1957 | Littig | 211/22 |
| 3,712,640 | 1/1973 | Shipman et al. | 280/301 |
| 4,026,546 | 5/1977 | Omori | 211/22 |
| 4,223,906 | 9/1980 | Gratza | 280/301 |
| 4,417,746 | 11/1983 | Baron | 280/301 |
| 4,450,968 | 5/1984 | Muellner | 211/17 |
| 4,474,387 | 10/1984 | Maranell et al. | 280/293 |
| 4,637,624 | 1/1987 | Shur | 280/304 |
| 5,067,739 | 11/1991 | Kuan | 280/304 |

FOREIGN PATENT DOCUMENTS

| | | | |
|---|---|---|---|
| 88960 | 3/1960 | Netherlands | 211/22 |
| 8448 | of 1899 | United Kingdom | 211/22 |

*Primary Examiner*—Ramon O. Ramirez
*Assistant Examiner*—Willie W. Berry, Jr.

[57] ABSTRACT

A two-wheeled vehicle support apparatus includes a kickstand-receiving support member adapted to rest on a support surface and be interposed between the ends of the kickstand and the support surface. A riser member is adapted to interlock with the kickstand-receiving support member. Also, the riser member is adapted to partially rest on the support surface, and a tire-supporting member is adapted for receiving a rear tire of a two-wheeled vehicle. The tire-supporting member includes a first tire-receiving portion adapted to receive a bottom portion of the tire. The tire-supporting member is interposed between the rear tire and the support surface. The riser member includes a ramp portion located at a leading end of the riser member. The kickstand-receiving support member includes a centrally located tongue portion and a pair of platform portions which straddle the tongue portion. The riser member includes a groove portion that is complementary to the tongue portion and is adapted to receive the tongue portion, whereby the kickstand-receiving support member and the riser member are locked together in a predetermined orientation and are prevented from rotating with respect to each other. The first tire-receiving portion has a concave shape and is located on the tire-supporting member at a position distal to the leading edge. The tire-supporting member includes a riser portion located between the leading edge and the first tire-receiving portion of the tire-supporting member.

9 Claims, 3 Drawing Sheets

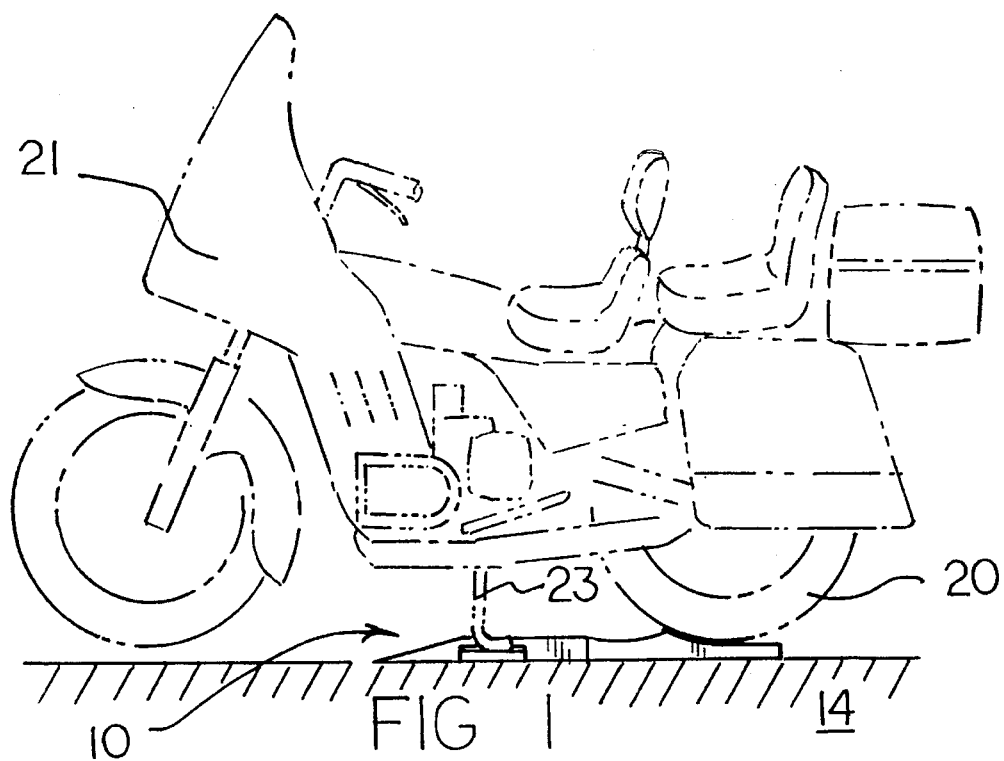
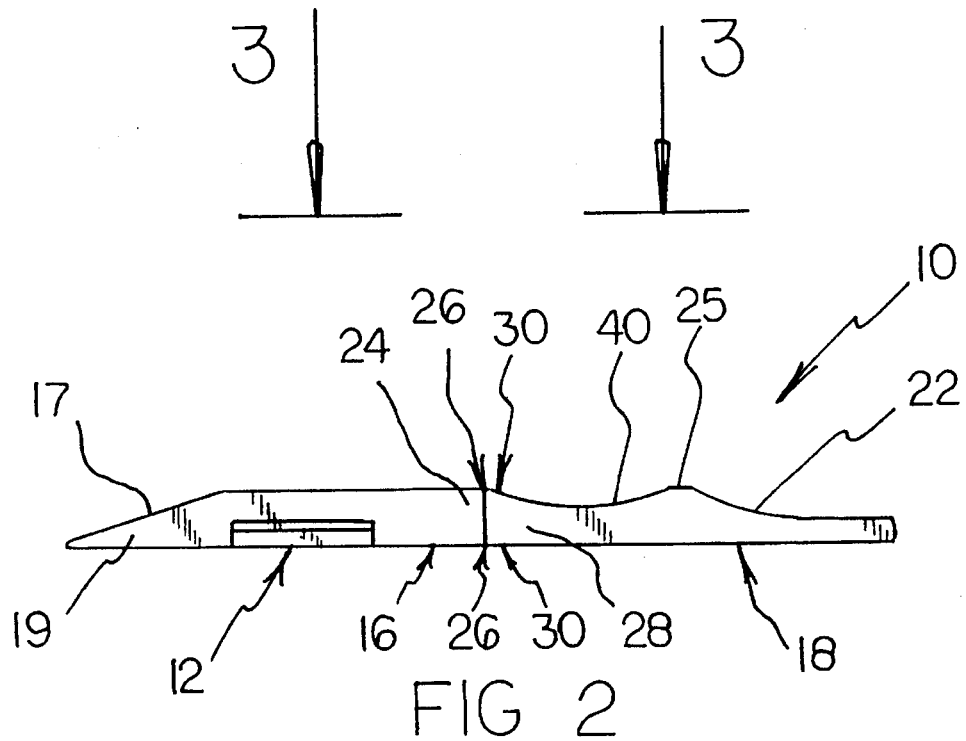

TWO WHEELED VEHICLE SUPPORT APPARATUS

BACKGROUND OF THE INVENTION

1. Field of the Invention

The present invention relates generally to support devices for two-wheeled vehicles such as motorcycles and bicycles, and, more particularly, to devices especially adapted for supporting two-wheeled vehicles in an upright orientation when parked.

2. Description of the Prior Art

When two-wheeled vehicles, such as motorcycles and bicycles, are parked, they are generally parked in an upright orientation. Generally a kickstand of some sort is carried by the two-wheeled vehicle and projects downward from the two-wheeled vehicle to contact the ground for support. The kickstand generally includes one or more feet which have relatively sharp ends. That is, the ends of the kickstand generally have a relatively small surface area. When the two-wheeled vehicle is parked, and the kickstand is used on a relatively soft surface, such as sand, soil, mud, or an asphalt surface, the ends of the kickstand may sink into the relatively soft surface. If the ends of the kickstand sink sufficiently far into the relatively soft surface, then the two-wheeled vehicle may fall over. Otherwise, the relatively soft surface may be damaged by the ends of the kickstand. In view of the above, it would be desirable if a device were provided to prevent ends of a kickstand of a two-wheeled vehicle from sinking into a relatively soft surface, thereby preventing the two-wheeled vehicle from falling over or damaging the soft surface.

Throughout the years, a number of innovations have been developed relating to kickstands for two-wheeled vehicles, and the following U.S. patents are representative of some of those innovations: U.S. Pat. Nos. 3,712,640; 4,223,906; 4,417,746; 4,637,624; and 5,067,739. It is noted that some of these patents include structures at the ends of the kickstands that effectively broaden the ends of the kickstands so the ends of the kickstands have a reduced tendency to sink into a soft surface. Yet each end of the kickstands is limited in its surface area to a relatively small surface area. To more effectively prevent an end of a kickstand from sinking into a soft surface, it would be desirable if a device having a relatively large surface area could be interposed between the ends of the kickstand and the surface that supports the two-wheeled vehicle.

Still other features would be desirable in a two-wheeled vehicle support apparatus. For example, it would desirable for a two-wheeled vehicle support apparatus to be readily cared and transported by the two-wheeled vehicle when the vehicle is in use. To occupy a relatively small space when in storage, it would be desirable for a two-wheeled vehicle support apparatus to be readily disassembled. In addition, to facilitate use of the two-wheeled vehicle support apparatus, it would be desirable for the two-wheeled vehicle support apparatus to be readily assembled.

When a two-wheeled vehicle is parked on a soft surface, not only the ends of a kickstand may sink into the soft surface. A tire, especially the rear tire which bears most of the weight of the vehicle, may also sink into the soft surface. In this respect, it would be desirable if a device having a relatively large surface area could be interposed between the rear tire and the surface that supports the two-wheeled vehicle.

For a device interposed between a tire and the supporting surface, it would be desirable for the interposed device to include a ramp portion that facilitates rolling of the tire onto the interposed device.

When a round tire is in contact with a flat surface, the round tire may readily roll on the flat surface. However, when a round tire is in contact with a round, concave surface, there is a reduced tendency of the round tire to roll off of the round, concave surface. In this respect, it would be desirable for a device interposed between a tire and a support surface to have a round, concave surface.

Thus, while the foregoing body of prior art indicates it to be well known to use kickstands to maintain a two-wheeled vehicle in an upright orientation on a support surface, the prior art described above does not teach or suggest a two-wheeled vehicle support apparatus which has the following combination of desirable features: (1) prevent ends of a kickstand of a two-wheeled vehicle from sinking into a relatively soft surface, thereby preventing the two-wheeled vehicle from falling over or damaging the soft surface; (2) provides a relatively large surface area can be interposed between the ends of the kickstand and the surface that supports the two-wheeled vehicle; (3) is readily carried and transported by the two-wheeled vehicle when the vehicle is in use; (4) is readily disassembled; (5) is readily assembled; (6) has: a relatively large surface area that can be interposed between the rear tire and the surface that supports the two-wheeled vehicle; (7) includes a ramp portion that facilitates rolling of the tire onto the interposed device; and (8) provides a round, concave surface interposed between a tire and a support surface. The foregoing desired characteristics are provided by the unique two-wheeled vehicle support apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a two-wheeled vehicle support apparatus which includes a kickstand-receiving support member adapted to rest on a support surface. A riser member is adapted to interlock with the kickstand-receiving support member. Also, the riser member adapted to partially rest on the support surface, and a tire-supporting member is adapted for receiving a rear tire of a two-wheeled vehicle. The tire-supporting member includes a first tire-receiving portion adapted to receive a bottom portion of the tire. The tire-supporting member is adapted to be interposed between the tire and the support surface when the two-wheeled vehicle is parked.

The riser member includes a trailing edge that includes a first edge height, and the tire-supporting member includes a leading edge that includes a second edge height. The first edge height and the second edge height are approximately equal to each other. The riser member includes a ramp portion located at a leading end of the riser member.

The kickstand-receiving support member includes a centrally located tongue portion and a pair of platform portions. One platform portion is on each side of the tongue portion. The riser member includes a groove portion that is complementary to the tongue portion of the kickstand-receiving support member and is adapted to receive the tongue portion, whereby the kickstand-receiving support member and the riser member are locked together in a predetermined orientation. The tongue portion of the kickstand-receiving support member is rectangular in shape, and the groove portion of the riser member includes two parallel walls adapted to receive the rectangular tongue portion, whereby the kickstand-receiving support member is prevented from rotating with respect to the riser member. The groove portion has a width; the tongue portion has a width; and the width of the groove portion is approximately equal to the width of the tongue portion.

The first tire-receiving portion is located on the tire-supporting member at a position distal to the leading edge. The first tire-receiving portion has a concave shape. The tire-supporting member includes a riser portion located between the leading edge and the first tire-receiving portion of the tire-supporting member. The tire-supporting member includes a second tire-receiving portion located on the tire-supporting member between the leading edge and the first tire-receiving portion. The second tire-receiving portion has a concave shape.

The above brief description sets forth rather broadly the more important features of the present invention in order that the detailed description thereof that follows may be better understood, and in order that the present contributions to the art may be better appreciated. There are, of course, additional features of the invention that will be desented hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved two-wheeled vehicle support apparatus which has all of the advantages of the prior art and none of the disadvantages.

It is another object of the present invention to provide a new and improved two-wheeled vehicle support apparatus which may be easily and efficiently manufactured and marketed.

It is a further object of the present invention to provide a new and improved two-wheeled vehicle support apparatus which is of durable and reliable construction.

An even further object of the present invention is to provide a new and improved two-wheeled vehicle support apparatus which is susceptible of a low cost of manufacture with regard to both materials and labor, and which accordingly is then susceptible of low prices of sale to the consuming public, thereby making such two-wheeled vehicle Support apparatus available to the buying public.

Still yet a further object of the present invention is to provide a new and improved two-wheeled vehicle support apparatus which prevent ends of a kickstand of a two-wheeled vehicle from sinking into a relatively soft surface, thereby preventing the two-wheeled vehicle from falling over or damaging the soft surface.

Still another object of the present invention is to provide a new and improved two-wheeled vehicle support apparatus that provides a relatively large surface area can be interposed between the ends of the kickstand and the surface that supports the two-wheeled vehicle.

Yet another object of the present invention is to provide a new and improved two-wheeled vehicle support apparatus which is readily carried and transported by the two-wheeled vehicle when the vehicle is in use.

Even another object of the present invention is to provide a new and improved two-wheeled vehicle support apparatus that is readily disassembled.

Still a further object of the present invention is to provide a new and improved two-wheeled vehicle support apparatus which is readily assembled.

Yet another object of the present invention is to provide a new and improved two-wheeled vehicle support apparatus that has a relatively large surface area that can be interposed between the rear tire and the surface that supports the two-wheeled vehicle.

Still another object of the present invention is to provide a new and improved two-wheeled vehicle support apparatus which includes a ramp portion that facilitates rolling of the tire onto the interposed device.

Yet another object of the present invention is to provide a new and improved two-wheeled vehicle support apparatus that provides a round, concave surface interposed between a tire and a support surface.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a side view showing a preferred embodiment of the two-wheeled vehicle support apparatus of the invention in use supporting a two-wheeled motorcycle.

FIG. 2 is an enlarged side view of the embodiment of the two-wheeled vehicle support apparatus shown in FIG. 1.

DESCRIPTION OF THE PREFERRED EMBODIMENT

With reference to the drawings, a new and improved two-wheeled vehicle support apparatus embodying the principles and concepts of the present invention will be described.

Figure 3:
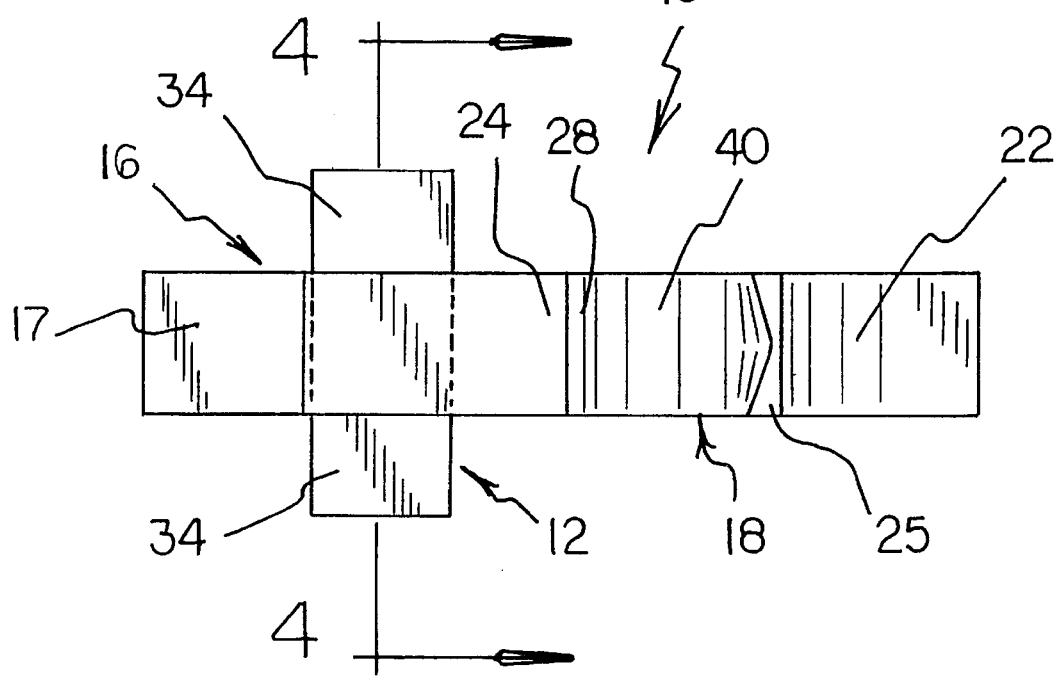
FIG. 3 is a top view of the embodiment of the two-wheeled vehicle support apparatus of FIG. 2 taken along line 3—3 thereof.
Figure 4:
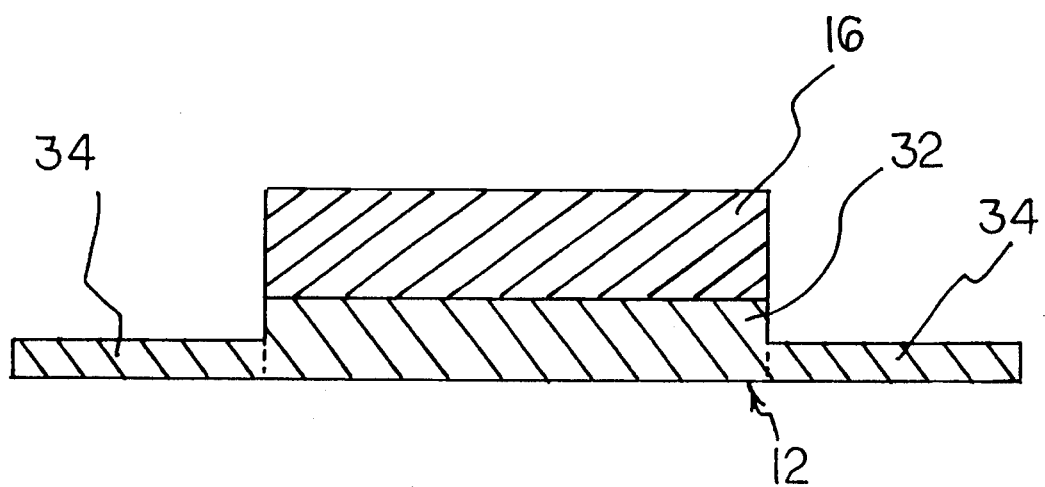
FIG. 4 is an enlarged cross-sectional view of the embodiment of the invention shown in FIG. 3 taken along line 4—4 of FIG. 3.
Figure 5:
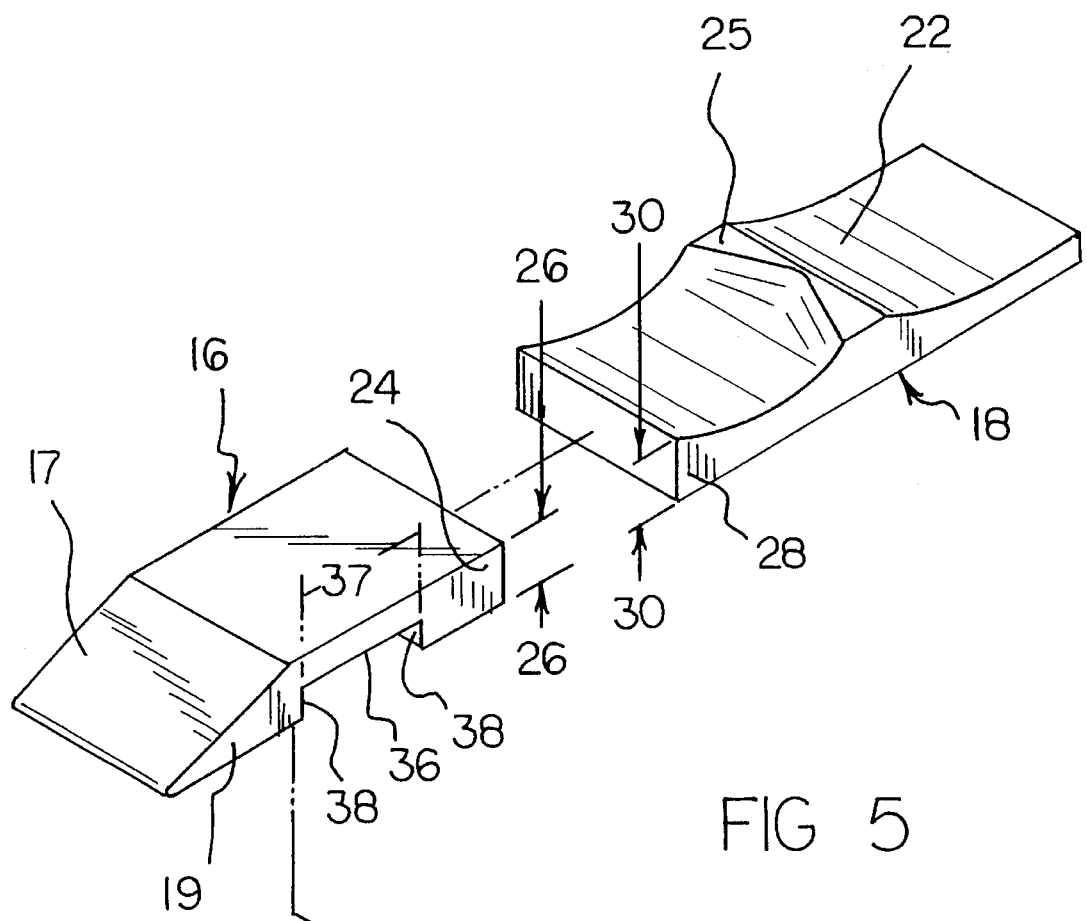
FIG. 5 is an exploded perspective view of the embodiment of the invention shown in FIG. 3.

Turning to FIGS. 1–5, there is shown an exemplary embodiment of the two-wheeled vehicle support apparatus of the invention generally designated by reference numeral 10. In its preferred form, two-wheeled vehicle support apparatus 10 includes a kickstand-receiving support member 12 adapted to rest on a support surface 14. A riser member 16 is adapted to interlock with the kickstand-receiving support member 12. Also, the riser member 16 adapted to partially rest on the support surface 14, and a tire-supporting member 18 is adapted for receiving a re tire 20 of a two-wheeled vehicle 21. The tire-supporting member 18 includes a first tire-receiving portion 22 adapted to receive a bottom portion of the tire 20. The fire-supporting member 18 is adapted to be interposed between the tire 20 and the support surface 14 when the two-wheeled vehicle 21 is parked.

The riser member 16 includes a trailing edge 24 that includes a first edge height 26, and the tire-supporting member 18 includes a leading edge 28 that includes a second edge height 30. The first edge height 26 and the second edge height 30 are approximately equal to each other. The riser member 16 includes a ramp portion 17 located at a leading end 19 of the riser member 16.

The kickstand-receiving support member 12 includes a centrally located tongue portion 32 and a pair of platform portions 34. One platform portion 34 is on each side of the tongue portion 32. The riser member 16 includes a groove portion 36 that is complementary to the tongue portion 32 of the kickstand-receiving support member 12 and is adapted to receive the tongue portion 32, whereby the kickstand-receiving support member 12 and the riser member 16 are locked together in a predetermined orientation. The tongue portion 32 of the kickstand-receiving support member 12 is rectangular in shape, and the groove portion 36 of the riser member 16 includes two parallel walls 38 adapted to receive the rectangular tongue portion 32, whereby the kickstand-receiving support member 12 is prevented from rotating with respect to the riser member 16. The groove portion 36 has a width 37; the tongue portion 32 has a width 39; and the width 37 of the groove portion 36 is approximately equal to the width 39 of the tongue portion 32.

The first tire-receiving portion 22 is located on the tire-supporting member 18 at a position distal to the leading edge 28. The first tire-receiving portion 22 has a concave shape. The tire-supporting member 18 includes a riser portion 25 located between the leading edge 28 and the first tire-receiving portion 22 of the tire-supporting member 18. The tire-supporting member 18 includes a second tire-receiving portion 40 located on the tire-supporting member 18 between the leading edge 28 and the first tire-receiving portion 22. In this case, the riser portion 25 of the tire-supporting member 18 is located between the second tire-receiving portion 40 and the first tire-receiving portion 22. The second tire-receiving portion 40 has a concave shape.

In operation of the two-wheeled vehicle support apparatus 10 of the invention, the kickstand-receiving support member 12, the riser member 16, and the tire-supporting member 18 are removed from storage piece by piece and are assembled in the following way. First, the kickstand-receiving support member 12 is placed on the support surface 14. Next, the riser member 16 is placed over the kickstand-receiving support member 12 so that the groove portion 36 of the riser member 16 fits over the complementary tongue portion 32 of the kickstand-receiving support member 12. A close fit exists between the groove portion 36 and the tongue portion 32 whereby the kickstand-receiving support member 12 and the riser member 16 are prevented from rotating with respect to each other. More specifically, the kickstand-receiving support member 12 is oriented at right angles with respect to the riser member 16. That is, the platform portions 34 of the kickstand-receiving support member 12 project outward from the riser member 16 with the riser member 16 located centrally between the platform portions 34. As a result of this assembly step, the kickstand-receiving support member 12 and the riser member 16 form a combined kickstand-receiving support member/riser member that rests on the support surface 14.

Then, the tire-supporting member 18 is placed up against the riser member 16 so that the trailing edge 24 of the riser member 16 is juxtaposed with the leading edge 28 of the tire-supporting member 18. The rear wheel and tire 20 of a two-wheeled vehicle 21, such as the motorcycle 21 shown in FIG. 1, is backed up the ramp portion 17 of the riser member 16. The rear tire 20 is rolled over the top of the riser member 16, is rolled past the trailing edge 24 of the riser member 16, is rolled past the leading edge 28 of the tire-supporting member 18, is rolled past the second tire-receiving portion 40 of the tire-supporting member 18, and is rolled onto the riser portion 25 of the tire-supporting member 18.

Then, the combined kickstand-receiving support member/riser member is positioned under the two-wheeled vehicle 21 so that the platform portions 34 of the kickstand-receiving support member 12 will be located under the ends of the kickstand 23 when the kickstand 23 is moved to a lowered position. Then, the kickstand 23 of the two-wheeled vehicle 21 is lowered whereby the ends of the kickstand 23 are positioned over the platform portions 34 of the kickstand-receiving support member 12. Then, the rear fire 20 is rolled further back off of the riser portion 25 so that the rear tire 20 rests in the first tire-receiving portion 22. As the rear tire 20 rides down into the first tire-receiving portion 22, the ends of the kickstand 23 are lowered into contact with the platform portions 34 of the kickstand-receiving support member 12. As a result, the kickstand 23 rests on the kickstand-receiving support member 12, and the rear tire 20 of the two-wheeled vehicle 21 rests on the first tire-receiving portion 22 of the tire-supporting member 18.

If desired, once the ends of the kickstand 23 have been lowered, the two-wheeled vehicle 21 can be pushed forward off of the riser portion 25 of the tire-supporting member 18 so that the rear tire 20 rests in the second tire-receiving portion 40. Once the rear tire 20 is in the first tire-receiving portion 22 (or the second tire-receiving portion 40) and the ends of the lowered kickstand 23 rest on the platform portions 34 of the kickstand-receiving support member 12, the two-wheeled vehicle 21 is parked.

To use the two-wheeled vehicle 21, the two-wheeled vehicle 21 must be removed from the parked condition. To do this, the rear tire 20 is rolled up to the riser portion 25 of the tire-supporting member 18. As a result, the ends of the kickstand 23 rise above the platform portions 34 of the kickstand-receiving support member 12. When this is done, the kickstand 23 is kicked up to its non-park position. Then the rear tire 20 is rolled forward past the leading edge 28 of the tire-supporting member 18, past the trailing edge 24 of the riser member 16, and down the ramp portion 17 of the riser member 16. Then, the riser member 16 can be lifted off of the kickstand-receiving support member 12, and the tire-supporting member 18, the riser member 16, and the kickstand-receiving support member 12 can be placed in storage until needed again.

It is noted that when the riser member 16 is placed over the kickstand-receiving support member 12 and when the platform portions 34 of the kickstand-receiving support member 12 and the first tire-receiving portion 22 (or the second tire-receiving portion 40) of the tire-supporting member 18 are supporting the two-wheeled vehicle 21. A relatively large surface area is interposed between the kickstand 23 and the re tire 20 and the support surface 14. In this way, there is a considerably reduced tendency of either the ends of the kickstand 23 or the rear tire 20 to sink into the support surface 14 when the two-wheeled vehicle 21 is parked.

Each of the kickstand-receiving support member 12, the riser member 16, and the tire-supporting member 18 can be made of a single piece of high density plastic material such as high density polyethylene.

Alternatively, the components of the two-wheeled vehicle support apparatus of the invention can be made from inexpensive and durable wood, metal, and other plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved two-wheeled vehicle support apparatus that is low in cost, relatively simple in design and operation, and which may advantageously be used to prevent ends of a kickstand of a two-wheeled vehicle from sinking into a relatively soft surface, thereby preventing the two-wheeled vehicle from falling over or damaging the soft surface. With the invention, a two-wheeled vehicle support apparatus provides a relatively large surface area can be interposed between the ends of the kickstand and the surface that supports the two-wheeled vehicle. With the invention, a two-wheeled vehicle support apparatus is provided which is readily carried and transported by the two-wheeled vehicle when the vehicle is in use. With the invention, a two-wheeled vehicle support apparatus is provided which is readily disassembled. With the invention, a two-wheeled vehicle support apparatus is provided which is readily assembled. With the invention, a two-wheeled vehicle support apparatus is provided which has a relatively large surface area that can be interposed between the rear tire and the surface that supports the two-wheeled vehicle. With the invention, a two-wheeled vehicle support apparatus is provided which includes a ramp portion that facilitates rolling of the tire onto the interposed device. With the invention, a two-wheeled vehicle support apparatus provides a round, concave surface interposed between a tire and a support surface.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed and desired to be protected by Letters Patent of the United States is as follows:

1. A two-wheeled vehicle support apparatus, comprising:

a kickstand-receiving support member adapted to rest on a support surface, a riser member adapted to interlock with said kickstand-receiving support member, said riser member adapted to be partially rest on the support surface, and a tire-supporting member adapted for receiving a tire of a two-wheeled vehicle, wherein said tire-supporting member includes a first tire-receiving portion adapted to receive a bottom portion of the tire, wherein said tire-supporting member is adapted to be interposed between the tire and the support surface when the two-wheeled vehicle is parked, wherein:

said kickstand-receiving support member includes a centrally located tongue portion and a pair of platform portions, one platform portion being on each side of said tongue portion, and said riser member includes a groove portion that is complementary to said tongue portion of said kickstand-receiving support member and is adapted to receive said tongue portion, whereby said kickstand-receiving support member and said riser member are locked together in a predetermined orientation, and wherein:

said tongue portion of said kickstand-receiving support member is rectangular in shape, and said groove portion of said riser member includes two parallel walls adapted to receive said rectangular tongue portion, whereby said kickstand-receiving support member is prevented from rotating with respect to said riser member.

2. The apparatus of claim 1 wherein:

said riser member includes a trailing edge that includes a first edge height, and said tire-supporting member includes a leading edge that includes a second edge height, wherein said first edge height and said second edge height are approximately equal to each other.

3. The apparatus of claim 1 wherein said riser member includes a ramp portion located at a leading end of said riser member.

4. The apparatus of claim 1 wherein:

said groove portion has a width, said tongue portion has a width, and said width of said groove portion is approximately equal to said width of said tongue portion.

5. The apparatus of claim 1 wherein said first tire-receiving portion is located on said tire-supporting member at a position distal to said leading edge.

6. The apparatus of claim 1 wherein said first tire-receiving portion has a concave shape.

7. The apparatus of claim 1 wherein said tire-supporting member includes a riser portion located between said leading edge and said first tire-receiving portion of said tire-supporting member.

8. The apparatus of claim 7 wherein said tire-supporting member includes a second tire-receiving portion located on said tire-supporting member between said leading edge and said first tire-receiving portion.

9. A two-wheeled vehicle support apparatus, comprising:

a kickstand-receiving support member adapted to rest on a support surface, a riser member adapted to interlock with said kickstand-receiving support member, said riser member adapted to be partially rest on the support surface, and a tire-supporting member adapted for receiving a tire of a two-wheeled vehicle, wherein said tire-supporting member includes a first tire-receiving portion adapted to receive a bottom portion of the tire, wherein said tire-supporting member is adapted to be interposed between the tire and the support surface when the two-wheeled vehicle is parked, wherein said tire-supporting member includes a riser portion located between said leading edge and said first tire-receiving portion of said tire-supporting member, wherein said tire-supporting member includes a second tire-receiving portion located on said tire-supporting member between said leading edge and said first tire-receiving portion, and wherein said second tire-receiving portion has a concave shape.

* * * * *